(12) United States Patent
Janssen

(10) Patent No.: US 9,074,713 B2
(45) Date of Patent: Jul. 7, 2015

(54) COUPLING DEVICE FOR A MARINE LOADING ARM

(75) Inventor: Albert Janssen, JE Ugchelen (NL)

(73) Assignee: Kanon Loading Equipment B.V., Zeewolde (NL)

( * ) Notice: Subject to any disclaimer, the term of this patent is extended or adjusted under 35 U.S.C. 154(b) by 468 days.

(21) Appl. No.: 12/531,126

(22) PCT Filed: Mar. 14, 2008

(86) PCT No.: PCT/NL2008/000081
§ 371 (c)(1),
(2), (4) Date: Jan. 7, 2010

(87) PCT Pub. No.: WO2008/115048
PCT Pub. Date: Sep. 25, 2008

(65) Prior Publication Data
US 2010/0108193 A1   May 6, 2010

(30) Foreign Application Priority Data

Mar. 19, 2007 (NL) ...................................... 1033558

(51) Int. Cl.
| F16L 23/00 | (2006.01) |
| F16L 37/12 | (2006.01) |
| F16L 37/62 | (2006.01) |

(52) U.S. Cl.
CPC ............. *F16L 37/1205* (2013.01); *F16L 37/62* (2013.01)

(58) Field of Classification Search
USPC ............ 285/406, 312, 920, 34, 35, 27, 28, 29
See application file for complete search history.

(56) References Cited

U.S. PATENT DOCUMENTS

| 2,634,927 | A | * | 4/1953 | Smith et al. ................ 244/135 A |
| 3,445,127 | A | * | 5/1969 | Clarke ............................. 285/88 |
| 3,489,434 | A | * | 1/1970 | Haley .................................. 285/1 |
| 3,558,161 | A | * | 1/1971 | Bormioli ......................... 285/27 |
| 3,586,350 | A | * | 6/1971 | Ashton ............................ 285/24 |
| 3,841,665 | A | * | 10/1974 | Capot ................................ 285/2 |
| 3,865,409 | A | * | 2/1975 | Paddington ..................... 285/18 |
| 3,865,412 | A | * | 2/1975 | Ashton .......................... 285/364 |
| 4,113,283 | A | * | 9/1978 | Curtis et al. .................... 285/12 |
| 4,202,567 | A | * | 5/1980 | Paddington ..................... 285/18 |
| 4,222,591 | A | * | 9/1980 | Haley .............................. 285/18 |
| 4,553,777 | A | * | 11/1985 | Paddington ................... 285/420 |
| 4,905,938 | A | * | 3/1990 | Braccio et al. ................ 244/101 |
| 4,923,219 | A | * | 5/1990 | Bormioli ......................... 285/18 |
| 6,843,511 | B2 | * | 1/2005 | Barry ............................ 285/320 |
| 7,699,359 | B2 | * | 4/2010 | Le Devehat et al. .......... 285/364 |
| 7,942,081 | B2 | * | 5/2011 | Hauk et al. .................... 81/57.19 |
| 2004/0035967 | A1 | * | 2/2004 | Johnson et al. ............... 241/207 |
| 2005/0121907 | A1 | * | 6/2005 | Le Devehat et al. .......... 285/320 |
| 2007/0057507 | A1 | | 3/2007 | Devehat et al. |

FOREIGN PATENT DOCUMENTS

| GB | 1395928 | 5/1975 |
| WO | WO 2004/033826 | 4/2004 |

\* cited by examiner

*Primary Examiner* — Aaron Dunwoody
(74) *Attorney, Agent, or Firm* — Michael Best & Friedrich LLP

(57) ABSTRACT

A coupling device for coupling a loading arm, for instance a marine loading arm, to an inlet/outlet conduit of a liquid container, the device including a cylindrical tube with a first inner diameter which is provided at a first end with a first flange which can be coupled to the loading arm and is provided at a second end with a second flange and with rapid-action coupling device for coupling the inlet/outlet conduit to the tube. The rapid-action coupling device is adapted to couple an inlet/outlet conduit having a second inner diameter smaller than the first inner diameter.

19 Claims, 4 Drawing Sheets

COUPLING DEVICE FOR A MARINE LOADING ARM

Figure 1:
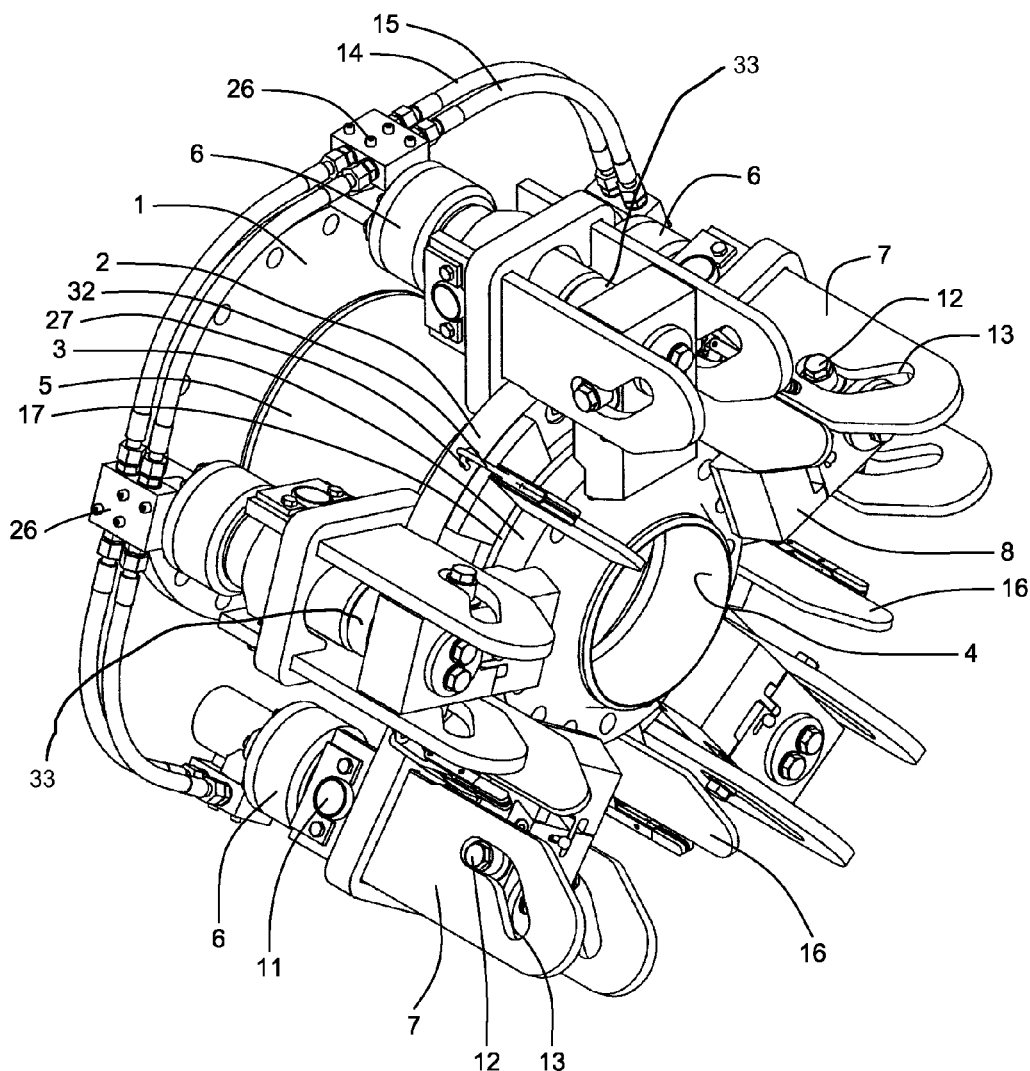

The invention relates to a coupling device for coupling a loading arm, for instance a marine loading arm, to an inlet/outlet conduit of a liquid container, comprising a cylindrical tube with a first inner diameter which is provided at a first end with a first flange which can be coupled to the loading arm and is provided at a second end with a second flange and with rapid-action coupling means for coupling the inlet/outlet conduit to the tube.

Such a coupling device is applied particularly in the loading or unloading of a tanker moored along a quayside respectively from or into an onshore liquid reservoir. The coupling device forms a connection which can be arranged rapidly between a pivotable loading arm disposed on the quay and connected to the liquid reservoir and the inlet/outlet conduit of the tanker.

Such a coupling device is known from the international patent application with publication number WO 2004/033826 A2. The rapid-action coupling means in the known coupling device are formed by four compression springs which are each coupled at an end to a respective pivotable claw which engages the end flange of an inlet/outlet conduit, and which are coupled at their other end to a rotatable disc which is driven by means of a hydraulic cylinder. The position of the one end of the springs is changed by rotating the disc. The springs are compressed by rotation of the disc in a first direction, wherein the claws hook round the end flange and the end flange is pressed onto the second flange of the coupling device, after which the end flange of the inlet/outlet conduit must be locked onto the second flange using a mechanical lock which must be placed over parts of the disc so as to thus lock the disc against rotation. The springs are extended by rotating the disc in an opposite direction, wherein the claws are released from the end flange and the end flange is no longer pressed onto the second flange of the coupling device.

The known coupling device has the drawback that it has a relatively complicated construction and is therefore relatively expensive while, as a result of an operative not paying attention, there is a risk of the end flange of the inlet/outlet conduit being pressed onto the second flange of the coupling device but not being locked thereon. This latter condition entails undesirable safety risks, since the liquids for loading or unloading are usually toxic or flammable. Wastage of liquids as a result of leaking conduits must moreover also be prevented for economic reasons.

A further drawback of the known coupling device is that it can only be applied to couple a loading arm and an inlet/outlet conduit which have the same diameter. Common types of loading arm have for instance a diameter of 12 or 16 inches (30.48 or 40.6 cm respectively), and with the known coupling device it is not possible to couple a loading arm with a diameter of 16 inches to an inlet/outlet conduit with a diameter of 12 inches.

It is an object of the invention to provide a coupling device using which it is possible in rapid and simple manner to couple a loading arm to the inlet/outlet conduit of a liquid container.

It is a further object to provide a coupling device which has a relatively simple construction and which provides an inherently safe coupling of a loading arm and an inlet/outlet conduit, wherein it is not necessary to arrange a mechanical locking through the intervention of an operative.

These objects are achieved, and other advantages gained, with a coupling device of the type stated in the preamble, wherein the rapid-action coupling means are adapted according to the invention to couple an inlet/outlet conduit having a second inner diameter smaller than the first inner diameter.

In an embodiment of a coupling device according to the invention the rapid-action coupling means comprise at least three clamping members which are placed along the periphery of the second flange and which are adapted to releasably clamp onto the second flange a third flange which forms the end flange of an inlet/outlet conduit with the second inner diameter, wherein an adapter is received between the second flange and the third flange.

A coupling device which has clamping members which are adapted to accommodate an adapter between the second and third flange provides the option of coupling a loading arm with a determined first inner diameter to an inlet/outlet conduit with a second, smaller diameter. This is particularly advantageous at locations where it is important to be able to load or unload successive tankers with inlet/outlet conduits with different inner diameters using the same loading arm.

The clamping members each comprise for instance a clamping element displaceable in axial and radial direction of the tube, and are for instance adapted to displace the respective clamping elements synchronously.

A displacement of the clamping elements, successively in radial direction toward the central axis of the second flange and in axial direction toward the plane of the second flange, results in the third flange being pressed onto the second flange, while a displacement successively in axial direction from the plane of the second flange and in radial direction from the central axis of the second flange results in the third flange being released from the second flange, and sufficient space being created between the clamping elements and the third flange to enable removal of the coupling device from the inlet/outlet conduit with this third flange.

In an embodiment of such clamping members the clamping elements are each received displaceably in guides which are coupled to the second flange and which extend in axial and radial direction of the tube.

For this purpose the clamping members for instance each comprise a screw spindle for displacing the respective clamping element, and are for instance each provided with a hydromotor for driving the respective screw spindle.

In an extremely advantageous embodiment of a coupling device with clamping members which each comprise a clamping element displaceable in axial and radial direction of the tube, each of the clamping elements is assembled from a permanent part and an exchangeable part which can be coupled thereto, wherein the exchangeable part is provided with at least one contact surface co-acting with the third flange at the end of the inlet/outlet conduit.

The exchangeable part is chosen in each case such that the at least one contact surface corresponds with the end flange of the inlet/outlet conduit for coupling.

In order to facilitate the coupling of a loading arm, a coupling device according to the invention comprises at least three fixing and guide members placed along the periphery of the second flange for the purpose of fixing an adapter placed on the second flange and guiding the third flange at the end of the inlet/outlet conduit to a position suitable for coupling.

The invention will be elucidated hereinbelow on the basis of an exemplary embodiment, with reference to the drawings.

In the drawings

Figure 2:
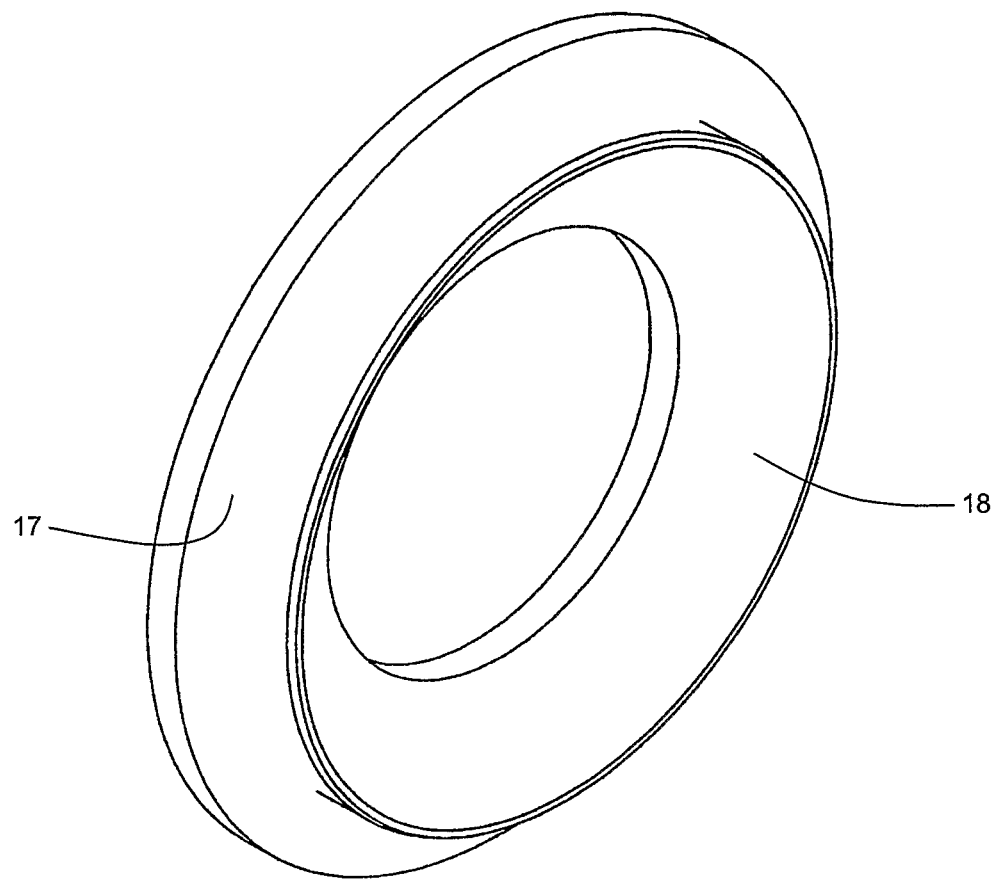
Figure 3:
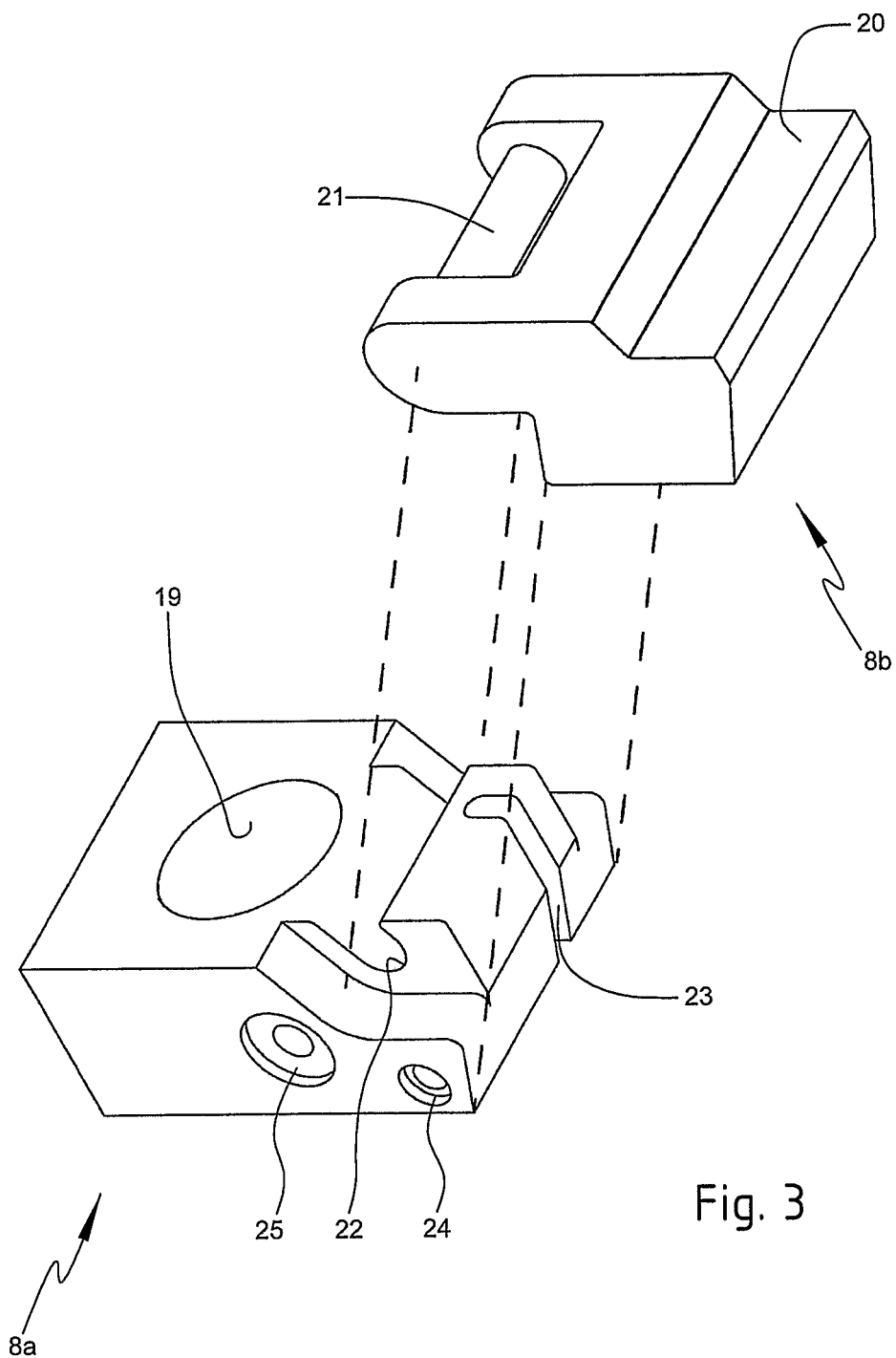
Figure 4:
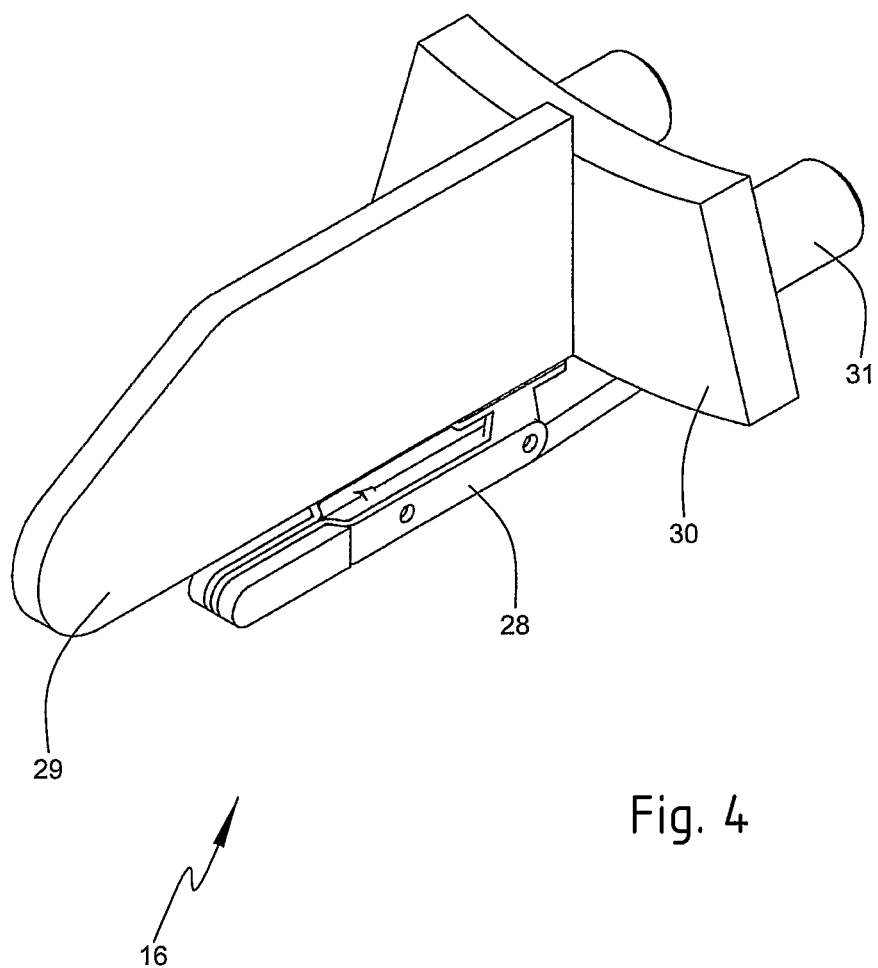

FIG. 1 shows a perspective view of an embodiment of a coupling device according to the invention, FIG. 2 is a perspective view of an adapter for a coupling device as shown in FIG. 1, FIG. 3 is an exploded view of a clamping element assembled from two parts for a coupling device as shown in FIG. 1, and FIG. 4 is a perspective view of a guide member for a coupling device as shown in FIG. 1.

Corresponding components are designated in the figures with the same reference numerals.

FIG. 1 shows a coupling device 10 assembled from a tube 5 with a first end flange 1 for coupling of a marine loading arm (not shown), and a second end flange 2 for coupling of end flange 3 of an inlet/outlet conduit 4 (partly shown) of a liquid tank on a tanker (not shown). Arranged along the periphery of second flange 2 are five clamping members (6, 7, 8), which are each assembled from a housing with cheeks 7, a hydromotor 6 which drives a screw spindle 33 and a clamping element 8 coupled to the screw spindle 33. In the shown example the inner diameter of tube 5 is greater than the inner diameter of inlet/outlet conduit 4, and an adapter 9 (shown in FIG. 2) with flange 17 is received between second flange 2 and end flange 3 of inlet/outlet conduit 4. The assembly of hydromotor 6, screw spindle 33 and clamping element 8 is arranged between cheeks 7 for pivoting about a shaft 11 extending transversely relative to tube 5. Guide slots 13 for guiding cams 12, which extend laterally from clamping elements 8, in axial and radial direction of tube 5 are arranged in cheeks 7. In the shown situation end flange 3 of inlet/outlet conduit 4 is held liquid-tightly on flange 17 of the adapter by clamping elements 8, this flange in turn being held liquid-tightly on second flange 2 of tube 5, wherein the screw spindles 33 are retracted as far as possible. Slots 13 in cheeks 7 are formed such that clamping elements 8 are displaced from the shown situation successively in axial direction from the plane of second flange 2 and in radial direction from the central axis of second flange 2 by unscrewing the screw spindles 33 (toward clamping elements 8), which results in end flange 3 of inlet/outlet conduit 4 being released from second flange 2 and sufficient space being created between clamping elements 8 and end flange 3 in order to enable removal of coupling device 10 from inlet/outlet conduit 4 with this end flange 3. The respective hydromotors 6 are connected in parallel with their liquid conduits 14, 15 (partly shown) and are provided with pressure-compensated flow control valves 26, as a result of which the respective screw spindles 33 and clamping elements 8 coupled thereto are driven synchronously. The figure further shows five fixing and guide members 16 placed along the periphery of second flange 2 for the purpose of fixing an adapter placed on second second flange 2 in the absence of a coupled inlet/outlet conduit 4 and for guiding an end flange 3 of an inlet/outlet conduit 4 to the position suitable for coupling prior to coupling of this end flange 3. Guide members 16 are hooked with hooks 32 into eyes 27 on the side of second flange 2.

FIG. 2 shows an adapter 9 with a flange 17 and a raised edge 18 which widens conically on its inner side and which must be directed toward tube 5. The smallest inner diameter of edge 18 corresponds to the inner diameter of an inlet/outlet conduit 4 for coupling, the largest inner diameter corresponds with the inner diameter of tube 5, whereby adapter 9 thus provides a continuous transition between inlet/outlet conduit 4 and tube 5 of coupling device 10.

FIG. 3 shows a steel clamping element assembled from parts 8a and 8b, wherein an opening 19 for receiving the screw spindle is present in fixed part 8a and the exchangeable part 8b comprises a contact surface 20 to be placed against third flange 3. In assembled position the exchangeable part 8b is received with a rigid shaft 21 and a tongue (not shown) in respectively a corresponding groove 22 and a channel 23 in fixed part 8a, and parts 8a, 8b are locked by a pin extending through a first transverse bore 24 in fixed part 8a and the tongue of exchangeable part 8b. The figure further shows a second transverse bore 25 in fixed part 8a for receiving side cams 12 with which the assembled clamping element 8a, b is guided through slots 13 in cheeks 7.

FIG. 4 shows a guide member 16 with a guide plate 29 which is fixed to a base plate 30 with which the guide member is placed on second flange 2. Base plate 30 is provided on its underside with pins 31 which fit precisely into free bores in second flange 2. In order to lock guide member 16 on second flange 2 member 16 is provided with a tensioning clamp 28, a hook 32 of which (shown in FIG. 1) engages just behind an eye 27 on second flange 2.

The invention claimed is:

1. A device for coupling a loading arm, for instance a marine loading arm, to an inlet/outlet conduit of a liquid container, the inlet/outlet conduit including a flange and having a conduit diameter, the device comprising:
 a cylindrical tube with a first inner diameter, the cylindrical tube including a first end and a second end, the first end having a first flange configured to be coupled to the loading arm, the second end having a second flange defining a periphery;
 a rapid-action coupler including at least three clamping members placed along the periphery of the second flange configured to releasably clamp the flange of the inlet/outlet conduit onto the second flange;
 an adapter configured to be positioned between the second flange and the inlet/outlet conduit flange;
 wherein each clamping member includes,
  a housing having a pair of cheeks, each cheek including a guide slot,
  a screw spindle,
  a hydromotor driving the screw spindle, and
  a clamping element coupled to the screw spindle, the clamping element positioned between the cheeks, wherein the screw spindle, hydromotor, and the clamping element pivot together relative to the tube about a shaft extending transversely relative to the tube, the clamping element including at least one guiding cam positioned within the guide slot in the cheeks.

2. The coupling device as claimed in claim 1, wherein the clamping element includes a fixed part and an exchangeable part, wherein the fixed part includes an opening for receiving the screw spindle and the exchangeable part includes a contact surface configured to be placed against the inlet/outlet conduit flange, wherein in an assembled position the exchangeable part is coupled to the fixed part by positioning a rigid shaft in a corresponding groove and positioning a tongue of the exchangeable part in a channel in the fixed part, and a pin extends through a first transverse bore in the fixed part and the tongue of the exchangeable part.

3. The coupling device as claimed in claim 1, further comprising at least three guide members placed along the periphery of the second flange for both the purpose of fixing the adapter placed on the second flange in the absence of a coupled inlet/outlet conduit, and for guiding the flange of the inlet/outlet conduit to a position suitable for coupling of this flange.

4. The coupling device as claimed in claim 3, wherein each guide member comprises a guide plate which is fixed to a base plate with which the guide member is placed on the second flange.

5. The coupling device as claimed in claim 3 wherein each guide member comprises a guide plate which is fixed to a base plate with which the guide member is placed on the second flange, the base plate having an underside including pins for fitting into free bores in the second flange.

6. The coupling device as claimed claim 3, wherein each guide member is provided with a tensioning clamp having a hook for engaging just behind an eye on the second flange for locking the guide member on the second flange.

7. The coupling device as claimed in 1, wherein said clamping members are adapted to displace the respective clamping elements synchronously.

8. A device for coupling a loading arm to an inlet/outlet conduit of a liquid container, the inlet/outlet conduit including a flange and having a conduit diameter, the device comprising:
   a cylindrical tube with a first inner diameter, the cylindrical tube including a first end and a second end, the first end having a first flange configured to be coupled to the loading arm, the second end having a second flange defining a periphery;
   an adapter configured to be positioned between the second flange and the inlet/outlet conduit flange; and
   at least three clamping members placed along the periphery of the second flange configured to releasably clamp the flange of the inlet/outlet conduit onto the second flange, each clamping member including,
      a housing having a pair of cheeks, each cheek including a guide slot,
      a screw spindle,
      a hydromotor driving the screw spindle, and
      a clamping element coupled to the screw spindle and positioned between the cheeks, the clamping element including at least one guiding cam positioned within the guide slot in the cheeks, the clamping element further including a fixed part and an exchangeable part, the fixed part including an opening for receiving the screw spindle and the exchangeable part including a contact surface configured to be placed against the inlet/outlet conduit flange,
   wherein the exchangeable part and the fixed part are coupled together by a shaft positioned within a groove, and the exchangeable part includes a tongue positioned in a channel of the fixed part, wherein a pin extends through the fixed part and the tongue to secure the exchangeable part and the fixed part against relative movement.

9. The device as claimed in claim 8, wherein the screw spindle, hydromotor, and the clamping element pivot together relative to the tube about a shaft extending transversely relative to the tube.

10. The device as claimed in claim 8, further comprising at least three guide members placed along the periphery of the second flange for positioning the adapter relative to the second flange, the guide members configured to guide the inlet/outlet conduit flange relative to the second flange as the inlet/outlet conduit flange is brought into engagement with the second flange.

11. The device as claimed in claim 10, wherein each guide member comprises a guide plate which is fixed to a base plate with which the guide member is placed on the second flange.

12. The device as claimed in claim 10, wherein each guide member comprises a guide plate which is fixed to a base plate with which the guide member is placed on the second flange, the base plate having an underside including pins for fitting into free bores in the second flange.

13. The device as claimed in claim 10, wherein each guide member is provided with a tensioning clamp having a hook for engaging just behind an eye on the second flange for locking the guide member on the second flange.

14. The device as claimed in claim 8, wherein said clamping members are adapted to displace the respective clamping elements synchronously.

15. A device for coupling a loading arm to an inlet/outlet conduit of a liquid container, the inlet/outlet conduit including a flange and having a conduit diameter, the device comprising:
   a cylindrical tube with a first inner diameter, the cylindrical tube including a first end and a second end, the first end having a first flange configured to be coupled to the loading arm, the second end having a second flange defining a periphery;
   an adapter configured to be positioned between the second flange and the inlet/outlet conduit flange;
   at least three clamping members placed along the periphery of the second flange configured to releasably clamp the flange of the inlet/outlet conduit onto the second flange, each clamping member including,
      a housing having a pair of cheeks, each cheek including a guide slot,
      a screw spindle,
      a hydromotor driving the screw spindle, and
      a clamping element coupled to the screw spindle and positioned between the cheeks, the clamping element including at least one guiding cam positioned within the guide slot in the cheeks, and
   at least three guide members placed along the periphery of the second flange for positioning the adapter relative to the second flange, the guide members configured to guide the inlet/outlet conduit flange relative to the second flange as the inlet/outlet conduit flange is brought into engagement with the second flange, each guide member including a hook engaging the second flange and a tensioning clamp biasing the hook, the hook and clamp securing the guide member relative to the second flange.

16. The device as claimed in claim 15, wherein each guide member comprises a guide plate which is fixed to a base plate with which the guide member is placed on the second flange.

17. The device as claimed in claim 15, wherein each guide member comprises a guide plate which is fixed to a base plate with which the guide member is placed on the second flange, the base plate having an underside including pins for fitting into free bores in the second flange.

18. The device as claimed in claim 15, wherein the screw spindle, hydromotor, and the clamping element pivot together relative to the tube about a shaft extending transversely relative to the tube.

19. The device as claimed in claim 15, wherein the clamping element further including a fixed part and an exchangeable part, the fixed part including an opening for receiving the screw spindle and the exchangeable part including a contact surface configured to be placed against the inlet/outlet conduit flange,
   wherein the exchangeable part and the fixed part are coupled together by a shaft positioned within a groove, and the exchangeable part includes a tongue positioned in a channel of the fixed part, wherein a pin extends through the fixed part and the tongue to secure the exchangeable part and the fixed part against relative movement.

* * * * *